Sept. 20, 1955   J. W. BANCROFT   2,718,146
FUEL GAGE APPARATUS
Filed Oct. 1, 1951
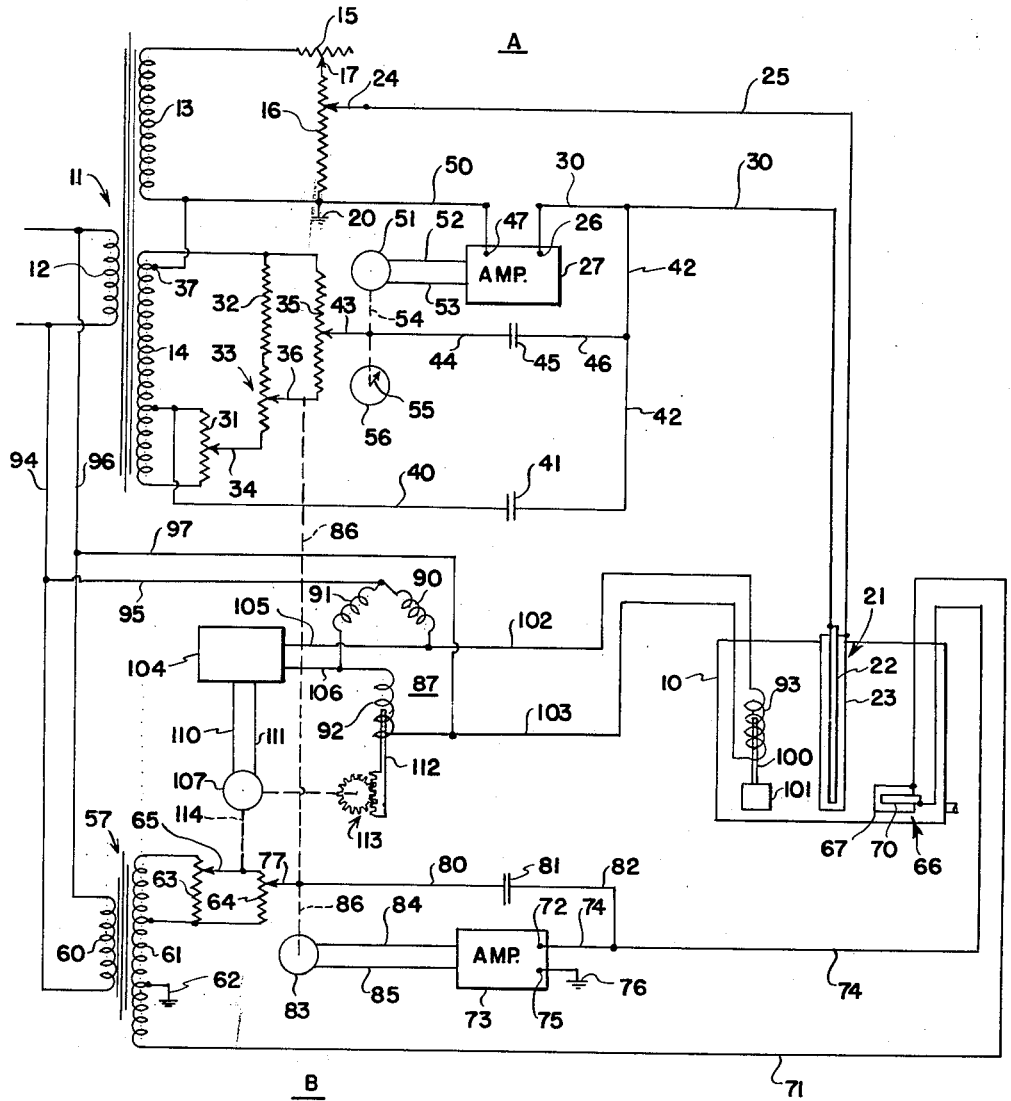
INVENTOR.
JOHN W. BANCROFT
BY George H. Fisher
ATTORNEY

United States Patent Office 2,718,146
Patented Sept. 20, 1955

2,718,146
FUEL GAGE APPARATUS

John W. Bancroft, Minneapolis, Minn., assignor to Minneapolis-Honeywell Regulator Company, Minneapolis, Minn., a corporation of Delaware Application October 1, 1951, Serial No. 249,192

5 Claims. (Cl. 73—304)

This invention relates to fuel gage measuring apparatus and more particularly to apparatus for measuring the weight of the fuel. It is therefore an object of the present invention to design apparatus for accurately measuring the weight of the fuel carried in an airplane.

A further object of the invention is to design a weight indication fuel gage which is simple in design and easily constructed.

Another object of the invention is to design a weight indication fuel gage generally similar to presently known fuel gages and capable of using many of the components of presently known fuel gages.

The invention makes use of a capacitance type measuring tank unit which gives an indication depending on the height of the fuel in the tank and on the dielectric constant of the fuel. If the horsepower output of an engine using the fuel varied as the volume of fuel consumed as measured by the dielectric properties or if the density or B. t. u. content of the fuel were to vary linearly with change in dielectric constant a capacitance gage giving an indication dependent upon dielectric constant would be completely satisfactory. However, because an engine produces horsepower in accordance with its B. t. u. input which is more closely proportional to the weight of fuel rather than to its dielectric constant or volume, a capacitance gage which gives an indication due to dielectric constant and with change in height variation does not give a completely satisfactory indication.

An advantage, therefore, of obtaining an indication of the total weight of the fuel is that the B. t. u. content of the fuel is known and it is then possible to tell how much power can be derived from the quantity of fuel in the plane.

For a more detailed description of the invention reference is had to the following disclosure taken in conjunction with the accompanying drawing in which:

The single figure is a schematic diagram of the measuring and indicating apparatus.

In the figure shown there is a bridge A which by itself gives an indication of the quantity of fuel in tank 10 according to the height of fuel and the dielectric constant of the fuel in the tank. However, when bridge A is operated upon by a further bridge B the actual value of the dielectric constant or a change in this value does not affect bridge A and the effect of density takes its place to give an indication of the quantity of fuel in the tank according to the height of the fuel and its density. While bridge A no longer is affected by the actual value of the dielectric constant of the fuel, or changes therein, it must be remembered that the operation of bridge A requires the fuel to have a different dielectric constant from the air or medium above the fuel.

Network A is energized by a transformer 11 having a primary 12, energized by a source of power not shown, and a pair of transformer secondaries 13 and 14.

Transformer secondary 13 has a rheostat 15 and an empty calibration potentiometer 16 connected across it. One terminal of the rheostat 15 is shown to be connected to the upper terminal of transformer secondary 13 with the wiper arm 17 of the rheostat being connected to one end of the potentiometer 16. The second end of potentiometer 16 is connected to the lower terminal of secondary 13. The lower terminal of potentiometer 16 is also connected to ground terminal 20.

A tank unit 21 is shown to have a pair of electrodes 22 and 23. Outer electrode 23 of the tank unit 21 is connected to the wiper arm 24 of the potentiometer 16 through conductor 25 while the inner electrode 22 of the tank unit 21 is connected to one of the input terminals 26 of amplifier 27 through conductor 30.

Transformer secondary 14 has a full calibration potentiometer 31 connected across the lower end of the secondary. A resistor 32 and a density adjusted potentiometer 33 are connected in series between the upper terminal of transformer secondary 14 and wiper arm 34 of potentiometer 31. A follow-up potentiometer 35 is connected between the upper terminal of transformer secondary 14 and wiper arm 36 of potentiometer 33. Transformer secondary 14 is connected to ground terminal 20 through a connection 37 near its upper terminal. The upper terminal of potentiometer 31 is connected to the input terminal 26 of amplifier 27 through a conductor 40, an empty balancing capacitor 41 and conductors 42 and 30. Wiper arm 43 of potentiometer 35 is connected to the input terminal 26 of amplifier 27 through conductor 44, a fuel quantity balancing capacitor 45 and conductors 46, 42, and 30. The second input terminal 47 of amplifier 27 is connected to ground terminal 20 through conductor 50.

Amplifier 27 is energized by any convenient source of power, not shown. Amplifier 27 is connected for operation to motor 51 through conductors 52 and 53. Motor 51 is connected through mechanical connection 54 to wiper arm 43 of follow-up potentiometer 35 and to pointer 55 of indicator dial 56. The amplifier and motor combination may be that shown in the patent to Upton 2,423,534, which is assigned to the same assignee as the present invention. The amplifier has a reversible output to reversibly operate the motor in a first or second direction depending upon the phase of the input signal with respect to the phase of the power supply.

The operation of network A, as so far described, is as follows:

Rheostat 15 and potentiometer 16 are adjusted for empty calibration. With the tank 10 empty of fuel, the wiper arm 24 of potentiometer 16 is first adjusted for rough calibration. Wiper arm 17 is then manually adjusted along rheostat 15 until motor 51 has moved needle 55 on indicator dial 56 to the zero position and wiper arm 43 is at a position along resistor 35 at which the potential is the same as grounded terminal 37 of transformer secondary 14. At this time, the only capacitance from tank unit 21 which is in the circuit is the empty capacitance value of the tank unit. This capacitance multiplied by the voltage across the capacitor is balanced out by the capacitance of capacitor 41 multiplied by the voltage across capacitor 41. As the apparatus is at balance the potential on input terminal 26 of amplifier 27 is the same as the potential on the input terminal 47, which is at ground potential.

For full calibration the tank 10 is filled and motor 51 operates to move wiper arm 43 downwardly along potentiometer 35 toward the lower end. Wiper arm 34 is then manually adjusted along potentiometer 31 until wiper arm 43 is moved to the lower end of potentiometer 35. Adjustment of wiper arm 34 affects the potential on the lower end of potentiometer 35 in that adjustment of wiper arm 34 affects the potential across resistor 32 and potentiometer 33, and thus the potential on wiper arm 36 of potentiometer 33. At the present time, it is to be remembered that wiper arm 36 is stationary on potentiometer 33. As the potential on wiper arm 36 is varied so is the potential across potentiometer 35. Thus, when the tank 10 is full the additional capacitance of the tank unit due to the fuel in the tank multiplied by the potential across the tank unit is balanced out by the capacitance of capacitor 45 multiplied by the voltage on wiper arm 43.

After the full calibration the empty calibration is checked again. This is essential especially if wiper arm 34 has been moved appreciably for the full calibration because change in voltage across potentiometer 35 changes the point of ground potential on the potentiometer.

The dielectric constant of the fuel in tank 10 obviously affects the capacitance of the tank unit 21 with change in the dielectric constant giving a change in the capacitance of the tank unit. As a result, the indication received on indicator dial 56 is a function of the height of the fuel multiplied by the dielectric constant. If the height of the fuel is denoted as $h$, the dielectric constant of the fuel as $K$ and the dielectric constant of air as $l$, the output of network A is proportional to $h(K-l)$. Actually, since the empty capacitance value of the tank unit 21 is balanced out through the use of capacitor 41 and since the dielectric constant of air is $l$ the indication on the indicator dial may be considered to be a function of the height of the fuel multiplied by the dielectric constant of the fuel minus $l$. Since the energy generated by the engines using the fuel is dependent upon the B. t. u. content of the fuel such indication dependent upon the dielectric constant of the fuel and the height of the fuel in the tank would be satisfactory if the B. t. u. content varied linearyl with change in dielectric constant. However, this is not the case. It has been found that the B. t. u. content of the fuel is more nearly constant with weight than with dielectric constant and so it is desirable that the indication on the indicator dial be a function of the height of the fuel times its density. Therefore, if the indication given by network A is operated upon by an indication of the density divided by the dielectric constant of the fuel minus the dielectric constant of the air, the indication on indicator dial 56 would then be a function of the height of the fuel multiplied by the density.

It is the purpose of the network B to put into network A an indication of the density divided by the dielectric constant of the fuel minus the dielectric constant of the air.

Network B is energized by a transformer 57 having a primary 60 energized from a source of voltage, not shown. Transformer 57 also has a secondary 61. At a point between its two terminals, transformer secondary 61 is connected to ground terminal 62. A density operated potentiometer 63 is connected across an upper portion of transformer secondary 61. A rebalancing potentiometer 64 is connected across wiper arm 65 of potentiometer 63 and the lower terminal of potentiometer 63.

The lower terminal of transformer secondary 61 is connected to a tank unit 66 having an outer electrode 67 and an inner electrode 70. The lower terminal of transformer secondary 61 is shown connected to the outer electrode 67 of tank unit 66 through conductor 71. The inner electrode 70 of the tank unit 66 is connected to input terminal 72 of amplifier 73 through conductor 74. The other input terminal 75 of amplifier 73 is connected to ground terminal 76. Amplifier 73 is energized by any convenient source of power, not shown. Thus, the signal from tank unit 66 due to the voltage across the tank unit multiplied by its capacitance, which is affected by the dielectric constant of the fuel is impressed on the input circuit of the amplifier.

Wiper arm 77 of potentiometer 64 is connected to input terminal 72 of amplifier 73 through conductor 80, capacitor 81 and conductors 82 and 74.

Amplifier 73 is connected to a motor 83 through conductors 84 and 85. Motor 83 is connected to wiper arm 77 of potentiometer 64 through a mechanical connection 86. This amplifier and motor combination may also be that shown in the patent to Upton, previously mentioned.

As so far described, network B operates to produce an output dependent upon the dielectric constant of the fuel minus the dielectric constant of the air. Motor 83 moves wiper arm 77 along potentiometer 64 in accordance with the change in capacitance of tank unit 66 which varies only with change in the dielectric constant of the fuel in tank 10. As seen in the drawing, tank unit 66 is positioned near the bottom of tank 10 and thus it is always completely immersed in the fuel in the tank until virtually all of the fuel in the tank is gone.

A density factor is put into network B as follows:

A network in the form of an inductance bridge 87 having a pair of fixed inductance coils 90 and 91 and a pair of variable inductive coils 92 and 93 is energized from the same source of voltage as places a potential across transformer primaries 12 and 60. The bridge 87 is shown to be connected across the input terminals of transformer primary 12 by conductors 94 and 95 with conductor 95 connected to the junction between fixed inductance coils 90 and 91 and by conductors 96 and 97 with conductor 97 connected to conductor 103, forming the junction between inductance coils 92 and 93. The output signal from bridge 87 is taken from between coils 91 and 92 and 90 and 93.

The inductance of inductance coil 93 is affected by movement of an iron core 100 connected to a float 101. The float 101 is always continually immersed in the fuel in tank 10 and rises and falls with the change in density of the fuel in the tank. Obviously, though not shown, the float 101, since it is completely immersed in an incompressible fluid, must work against a spring in order to operate. This rise and fall of float 101 moves the iron core 100 within inductance coil 93 to vary the inductance of the coil. Inductance coil 93 is shown to be connected to one terminal of inductance coil 90 through conductor 102 with the other terminal of coil 93 being connected to one terminal of inductance coil 92 through conductor 103.

The output of bridge 87 is connected to amplifier 104 through conductors 105 and 106. Amplifier 104 operates upon motor 107 through conductors 110 and 111. This amplifier and motor combination may also be that shown in the Upton patent, previously described.

Motor 107 operates upon an iron core 112 associated with inductance coil 92, by means of gearing arrangement 113, to rebalance the bridge 87 upon movement of core 100 within coil 93 unbalancing the bridge and causing energization of amplifier 104 and operation of motor 107. Motor 107 is also connected to wiper arm 65 of potentiometer 63 through mechanical connection 114.

Because change in the density of the fuel moves float 101 which moves core 100 within coil 93 to change the inductance of coil 93, it can be seen that the output voltage of network 87 is dependent upon change in density of the fuel in tank 10. Thus, the output of the network 87, the output of amplifier 104, and the operation of motor 107 are all dependent upon change in density of the fuel. As a result, operation of motor 107 on wiper arm 65 of potentiometer 63 puts into network B an indication due to the density of the fuel in tank 10. This density indication is compared with the dielectric constant indication in the input circuit of amplifier 73. The output signal from potentiometer 63 is multiplied by the position of wiper 77 on potentiometer 64. When network B is balanced this signal from wiper 77 is equal and opposite to the signal indicative of the dielectric constant of the fluid in the tank minus the dielectric constant of air. Therefore the position of wiper 77 on potentiometer 64 is proportional to the dielectric constant of the fluid minus the dielectric constant of air divided by the density of the fluid.

If the dielectric constant of the fuel is represented as $K$, the dielectric constant of the air is represented as $l$ and the density of the fuel is represented as D the output from network B is proportional to $$\frac{K-l}{D}$$

If $h$ is permitted to represent the height of the fuel in tank 10, the uncompensated indication of network A is proportional to $(K-l)\,h$, as previously stated.

By connecting motor 83 of network B to wiper arm 36 of potentiometer 33 in network A the network B acts upon network A to make the output signal from potentiometer 33 proportional to $$\frac{K-l}{D}$$

This output signal is multiplied by the position of wiper 43 on potentiometer 35.

When network A is balanced this signal from wiper 43 is equal and opposite to the signal indicative of the dielectric constant of the fluid minus the dielectric constant of air multiplied by the height of the fluid in the tank. In other words if the position of wiper 43 is represented by $P^1$ then $$\frac{K-l}{D}P^1 = (K-l)h$$

or $P^1 = hD$. Since the dial reading of indicator 56 is an indication of the position of wiper 43 indicator 56 indicates the weight of the fluid, which is height times the density.

It is thus seen that a network has been designed which gives an indication of the weight, and thus a close approximation of the B. t. u. content, of the fuel, making it possible to ascertain the amount of power which can be derived from the fuel still in the plane.

It is realized that various modifications may be made by those skilled in the art and it is therefore intended that the scope of this invention be limited only to the extent of the appended claims.

I claim as my invention:

1. Apparatus for measuring the weight of fluid in a container comprising: a first capacitor, the capacitance of which is determined by the height and dielectric constant of the fluid in the container; means connecting said capacitor to a first source of fixed potential and deriving a first electrical signal due to the capacitance of said capacitor and the voltage across said capacitor; a second capacitor; means variably connecting said second capacitor to a second source of variable potential and deriving a second electrical signal due to the capacitance of said second capacitor and the voltage across said second capacitor; density sensitive means positioned in the fluid in the container; means connecting said density sensitive means to a third source of potential and controlling the voltage of that source in accordance with the density of the fluid in the container; a third capacitor; means variably connecting said third capacitor to said third source and deriving a third electrical signal due to the capacitance of said third capacitor and the voltage across said third capacitor; a fourth capacitor, the capacitance of which is determined by the dielectric constant of the fluid in the container; means connecting said fourth capacitor to a fourth source of fixed potential and deriving a fourth electrical signal due to the capacitance of said fourth capacitor and the voltage across said fourth capacitor; motor means; comparing means comparing said third and fourth signals and connected to said motor means and controlling the operation of said motor means in accordance with the difference in magnitude of said third and fourth signals; means connecting said motor means to the connection of said third capacitor to said third source for varying the voltage across said third capacitor until said third and fourth signals are equal in magnitude; further means connecting said motor means to said second source of variable potential and varying the magnitude of voltage of said second source in accordance with the density and dielectric constant of the fluid in the container; and means comparing said first and second signals such as to eliminate the effect of variation in the dielectric constant of the fluid and derive an indication dependent in magnitude upon the height and density of the fluid in the container.

2. Apparatus for measuring the weight of fluid in a container comprising: a first circuit comprising a first capacitor positioned in the container and subjected to the fluid in the container such that the capacitance of said capacitor is determined by the height and dielectric constant of the fluid in the container, a second capacitor, a first source of voltage, a second source of voltage opposite in phase to said first source of voltage, means connecting one of said capacitors to said first source of voltage and deriving a first electrical signal, means variably connecting the other of said capacitors to said second source of voltage and deriving a second electrical signal, means comparing said signals and varying the connection of said other capacitor to said second source of voltage and varying the second signal such that the second signal tends to become equal in magnitude and opposite in phase to the first signal, and indicating means connected to said comparing means; second circuit means comprising a third source of voltage, density measuring means connected to said third source of voltage and positioned in the container such as to derive a third electrical signal, a third capacitor subjected to the fluid in the container such that the capacitance of said capacitor is determined by the dielectric constant of the fluid in the container, a fourth source of voltage opposite in phase to said third source of voltage, means connecting said third capacitor to said fourth source of voltage and deriving a fourth electrical signal, means comparing said third and fourth signals and varying the connection of one of said third and fourth voltage sources to one of said density measuring means and third capacitor such that the third and fourth signals tend to become equal in magnitude and opposite in phase; and means connecting said comparing means of said second circuit means to said second voltage source of said first circuit means and varying the magnitude of voltage of said second voltage source of said first circuit means such that the electrical signal due to said other capacitor is a function of the density and dielectric constant of the fluid and eliminates the effect of change in dielectric constant of the fluid on said indicating means, the indication of said indicating means being a function only of the weight of the fluid in the container.

3. Apparatus for measuring the weight of fluid in a container comprising: a first capacitor to be inserted in a container of fluid such that the capacitance of said capacitor is determined by the height and dielectric constant of the fluid in the container; a second capacitor; a first source of fixed potential, a second source of variable potential having a potential of opposite phase to the phase of the potential of said first source of fixed potential; means connecting one of said capacitors to said first source of fixed potential and providing a first electrical signal which is a function of the capacitance of said one capacitor and the voltage across said one capacitor; means connecting the other of said capacitors to said second source of variable potential and providing a second electrical signal which is a function of the capacitance of said other capacitor and the voltage across said other capacitor; first comparing means connected to said first and second capacitors and comparing the first and second electrical signals; first motor means connected to said first comparing means such as to operate said first motor means upon said first and second electrical signals having different magnitudes; means connecting said first motor means to said second source of variable potential such as to vary the voltage across said other capacitor upon said first and second electrical signals being of different magnitudes and varying the magnitude of said second electrical signal in a direction such that said second electrical signal tends to become equal to the magnitude of said first electrical signal; a third source of potential; density sensitive means inserted in the container of fluid and connected to said third source of potential and providing a third electrical signal which is a function of the density of the fluid; a third capacitor inserted in the container of fluid such that the capacitance of said third capacitor is determined by the dielectric constant of the fluid in the container; a fourth source of potential having a potential of opposite phase to the phase of the potential of said third potential source connected to said third capacitor and providing a fourth electrical signal which is a function of the dielectric constant of the fluid in the container; second comparing means connected to said density sensitive means and said third capacitor and comparing said third and fourth electrical signals; second motor means connected to said second comparing means such as to operate said second motor means upon said third and fourth electrical signals having different magnitudes; means connecting said second motor means to one of said third and fourth potential sources to vary the voltage across that source and thus vary the electrical signal due to the device connected to that source until the magnitudes of said third and fourth electrical signals are equal; further means connecting said second motor means to said second source of variable potential and controlling the voltage across said second source of variable potential such that the potential of that source is such a function of the density and dielectric constant of the fluid in the container that the effect of variation of dielectric constant of the fluid is eliminated and operation of said first motor means is a function of the height and density of the fluid; and an indicator connected to said first motor means and providing an indication of the weight of the fluid in the container.

4. Apparatus for measuring the weight of fluid in a container comprising: balanceable electrical circuit means including a capacitor adapted to be subjected to the fluid such that the capacitance of the capacitor is determined by the height of the fluid in the container and the dielectric constant of the fluid for deriving a first electrical voltage signal dependent in magnitude upon the capacitance of said capacitor; second circuit means including dielectric constant sensitive means adapted to be subjected to the fluid for deriving a second electrical voltage signal dependent in magnitude upon the dielectric constant of the fluid, density sensitive means connected in modifying relation to said second circuit means to modify said second signal in accordance with fluid density; and means connecting said second circuit means in modifying relation to said balanceable circuit means to modify the balance condition thereof in a manner to compensate for variation in dielectric constant value and to take into account the density of the fluid to provide an indication dependent upon the height of the fluid in the container and the density of the fluid.

5. Apparatus for measuring the weight of fluid in a container comprising: fluid quantity measuring apparatus including a normally balanced capacitance bridge network having a first capacitor positioned in the container and subjected to the fluid in the container such that the capacitance of the capacitor is determined by the height and dielectric constant of the fluid in the container, and having a first source of voltage connected to said first capacitor for deriving a first electrical signal which is a function of the height and dielectric constant of the fluid in the container; density sensitive means, dielectric constant sensitive means, said density sensitive means and said dielectric constant sensitive means being positioned in the fluid in the container, a second source of voltage, circuit means connecting said dielectric constant sensitive means to said second source of voltage for deriving a second electrical signal which is a function of the dielectric constant of the fluid in the container, means connecting said density sensitive means to said circuit means to modify said second electrical signal in accordance with fluid density; and means connecting said circuit means in modifying relation to said capacitance bridge network of said fluid quantity measuring apparatus to modify the balance condition of said bridge network in a manner to compensate for variation in dielectric constant and to take into account the density of the fluid to provide an indication dependent upon the weight of the fluid in the container.

References Cited in the file of this patent

UNITED STATES PATENTS

| | | |
|---|---|---|
| 1,788,465 | Lamar | Jan. 13, 1931 |
| 2,273,850 | Ewald | Feb. 24, 1942 |
| 2,581,085 | Edelman | May 20, 1952 |